(12) United States Patent
Prehofer

(10) Patent No.: US 10,919,513 B2
(45) Date of Patent: Feb. 16, 2021

(54) DEVICE AND METHOD FOR FORECASTING WEAR IN BRAKE LININGS

(71) Applicant: Siemens AG Öesterreich, Vienna (AT)

(72) Inventor: Boris Andre Prehofer, Graz (AT)

(73) Assignee: SIEMENS MOBILITY AUSTRIA GMBH, Vienna (AT)

( * ) Notice: Subject to any disclaimer, the term of this patent is extended or adjusted under 35 U.S.C. 154(b) by 0 days.

(21) Appl. No.: 15/547,355

(22) PCT Filed: Nov. 4, 2015

(86) PCT No.: PCT/EP2015/075679
§ 371 (c)(1),
(2) Date: Nov. 1, 2017

(87) PCT Pub. No.: WO2016/119929
PCT Pub. Date: Aug. 4, 2016

(65) Prior Publication Data
US 2018/0141534 A1 May 24, 2018

(30) Foreign Application Priority Data
Jan. 29, 2015 (AT) ............................. A 50064/2015

(51) Int. Cl.
*B60T 17/22* (2006.01)
*B61H 5/00* (2006.01)
(Continued)

(52) U.S. Cl.
CPC .......... *B60T 17/228* (2013.01); *B60T 17/221* (2013.01); *B61H 5/00* (2013.01); *F16D 66/02* (2013.01);
(Continued)

(58) Field of Classification Search
None
See application file for complete search history.

(56) References Cited

U.S. PATENT DOCUMENTS

2008/0236269 A1* 10/2008 Howell ................. B60T 17/221
73/121
2009/0266653 A1* 10/2009 Antanaitis ............... F16D 65/12
188/72.1
(Continued)

FOREIGN PATENT DOCUMENTS

CN 101936352 1/2011
DE 4316993 11/1994
(Continued)

*Primary Examiner* — Peter D Nolan
*Assistant Examiner* — Demetra R Smith-Stewart
(74) *Attorney, Agent, or Firm* — Cozen O'Connor

(57) ABSTRACT

A device and method for forecasting the brake lining wear, in particular the brake lining of rail vehicles, wherein the lining thicknesses, the sliding speed, the contact pressure, the total braking time, as well as optionally the temperature or the brake power are determined in a parameterization process during test drives with measurements at predefined time intervals, and the wear, the constant, as well as the material parameters are determined therefrom, where during the operating state, the wear rates are determined via the now known values of the material parameters and of the constants, and the wear is determined therefrom and, from the maximum allowable wear values, a remaining total braking time is then determined until the next lining replacement is required.

7 Claims, 3 Drawing Sheets

(51) Int. Cl.
*F16D 66/02* (2006.01)
*F16D 66/00* (2006.01)

(52) U.S. Cl.
CPC ...... *F16D 66/027* (2013.01); *F16D 2066/006* (2013.01)

(56) References Cited

U.S. PATENT DOCUMENTS

| | | | | |
|---|---|---|---|---|
| 2014/0229042 A1* | 8/2014 | Elstorpff | ............... | B60T 8/1705 701/19 |
| 2015/0114771 A1* | 4/2015 | Putz | ........................ | B60T 7/042 188/158 |
| 2018/0001882 A1* | 1/2018 | Goncalves | ............ | B60T 17/228 |

FOREIGN PATENT DOCUMENTS

| | | |
|---|---|---|
| DE | 10029238 | 12/2001 |
| DE | 10127480 | 3/2002 |
| DE | 102007035332 | 1/2009 |
| DE | 102008015288 | 4/2009 |
| EP | 1384638 | 7/2003 |
| EP | 1950111 | 1/2008 |
| SU | 943050 | 4/1982 |
| SU | 1590744 | 9/1990 |

\* cited by examiner

DEVICE AND METHOD FOR FORECASTING WEAR IN BRAKE LININGS

CROSS-REFERENCE TO RELATED APPLICATIONS

This is a U.S. national stage of application No. PCT/EP2015/075679 filed 4 Nov. 2015, and claims the priority of Australian application No. A50064/2015 filed Jan. 29, 2015, the content of which is incorporated herein by reference in its entirety.

BACKGROUND OF THE INVENTION

1. Field of the Invention

The invention relates to a device and method for forecasting the wear in brake linings, of rail vehicles in particular.

2. Description of the Related Art

Brake linings of friction braking systems are exposed to wear during use, whereby the lining thickness is continuously reduced. If a brake lining falls below its specified minimum thickness, it must be replaced, because otherwise damage to the braking system may occur or the braking effect may be diminished.

The identification of the allowable limit level requires continuous monitoring of the lining thickness using methods that are expensive technically, in terms of time, and financially. Moreover, and particularly in the case of expensive sintered linings, it is important to estimate the lining thickness precisely to avoid lining replacement before the corresponding wear limit value is reached and thereby to fully utilize the available wear reserve of the lining.

When monitoring a brake lining, possible asymmetric abrasion (so-called diagonal wear) must also be taken into consideration, because specified limit values for this occurrence must also be respected and the braking effect may be diminished if these limit values are exceeded.

EP 1 384 638 B1 discloses a device and a method for monitoring the functional state or wear state of brake linings or brake discs of a vehicle brake.

According to the teaching of this document, the sliding speed between the brake linings and the brake disc during a braking process, the temperature of the friction surfaces of at least one brake lining, and the braking force during the braking process are measured by sensors, in addition to which the braking time of the braking process is determined, and the wear of the brake lining at the end of the braking time is determined from the sliding speed, the temperature, the braking force, the braking time, the brake lining surface, and from material-specific parameters such as a correlation constant and exponents.

SUMMARY OF THE INVENTION

It is an object of the present invention is to provide a device and method for reducing the number of sensors that are required to forecast wear in the context of brake linings.

This and other objects and advantages are achieved in accordance with the invention by a device and method that has a low level of technical complexity and is therefore highly resilient. The device and method moreover are economical to realize, because expensive sensors are omitted.

As a result of using field data to parameterize the model, a wear forecast that is highly realistic and very accurate is ensured.

Moreover, the method in accordance with the invention also results in an immediate validation of the model.

However, it is also feasible to parameterize the model via trials on a test stand.

The forecast calculation is also possible in relation to diagonal wear. It is therefore possible both to detect that limit values for diagonal wear have been reached and to provide information relating to improvements in the friction braking system (e.g., optimization of the pressure point between lining and disc) to reduce diagonal wear.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

The invention is explained in greater detail with reference to figures, in which.

DETAILED DESCRIPTION OF THE EXEMPLARY EMBODIMENTS

In accordance with the invention, the abrasion of brake linings of rail vehicles is determined via a method in which a wear rate $\tilde{W}$ is determined in accordance with the following relationship:

$$\tilde{W} = C \cdot A \cdot p^{\alpha} \cdot v^{\beta} \cdot t_B^{\gamma} \cdot P^{\delta} \cdot T^{\varepsilon} \qquad \text{Eq. 1}$$

where
C=general constant,
A=lining surface,
p=contact pressure,
v=sliding speed,
$t_B$=braking time,
P=brake power,
T=contact temperature of the friction pairing,
α=material parameter pressure,
β=material parameter speed,
γ=material parameter braking time,
δ=material parameter brake power, and
ε=material parameter temperature.

Significant factors for determining the wear rate $\tilde{W}$ are lining surface A, contact pressure p, sliding speed v and braking time $t_B$. The use of the contact temperature T and the brake power P is optional, i.e., not essential.

While the lining surface A is derived from the structural features of the brake, the contact pressure p, the sliding speed v and the braking time $t_B$ are determined continuously during operation. The determination of the contact pressure p and the sliding speed is based on the capture of the cylinder pressure and the running speed and, with reference to the geometric and kinematic properties of the braking system, an arithmetic transformation of these variables.

The contact temperature T and the brake power P can be determined via simulation if suitable arithmetic models are available, and optionally used in the above formula. If under certain operating conditions one or both of the cited values are not available, this is allowed for by setting the corresponding material parameters $\varepsilon$, $\delta=0$, such that the respective associated variables contact temperature T, brake power P do not have any effect in the formula.

The determination of the material parameters $\alpha$, $\beta$, $\gamma$, $\delta$, $\varepsilon$ and the general constant C occurs during test runs or operational monitoring performed in an observed railroad network using a reference vehicle that is equipped with suitable systems for capturing cylinder pressure and running speed and optionally for simulating contact temperature T and brake power P.

Moreover, after each test run the brakes are examined and the total actual wear $W_o$, i.e., the abrasion of the brake linings during this run is determined.

Figure 1:
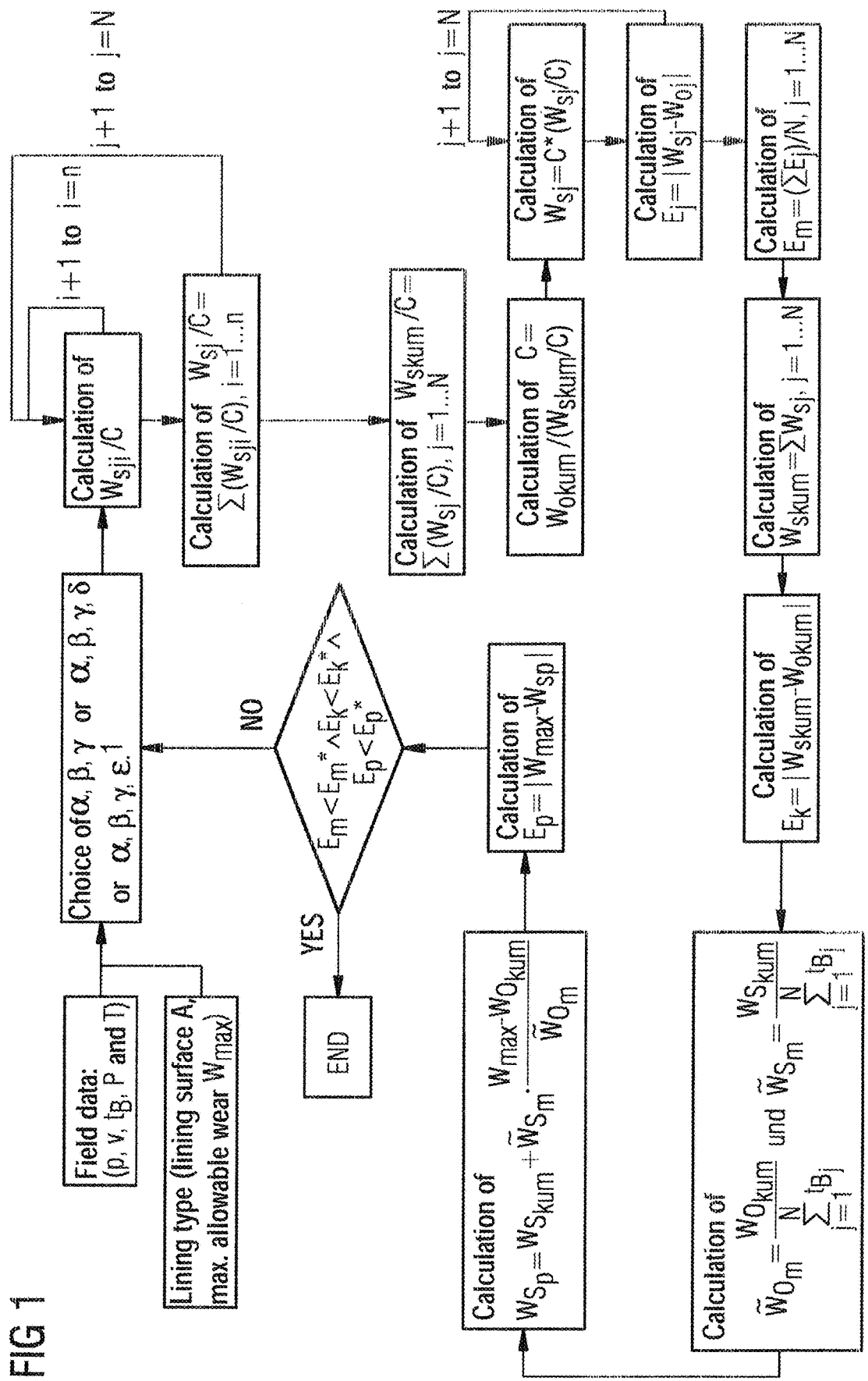
FIG. 1 shows an exemplary flow diagram for determining the material parameters and coefficients of a relationship for determining the abrasion of brake linings in accordance with the invention.

The determination of the material parameters $\alpha$, $\beta$, $\gamma$, $\delta$, $\varepsilon$ and the general constant C is effected using an iterative method such as that illustrated in FIG. 1. In addition, the measured total wear $W_o$ is compared with a calculated total wear $W_s$.

In addition, the results of each test run or each monitoring time window of operational monitoring, i.e., the values determined in n time steps during the test run for contact pressure p, sliding speed v and braking time $t_B$ and optionally also the values for temperature T or brake power P, are assigned to a measuring period.

Using a first selection of material parameters $\alpha$, $\beta$, $\gamma$, $\delta$, $\varepsilon$, where the selection is based on experimental values, wear values $W_{sji}/C$ that are normalized relative to the general constant C are then calculated for each measuring time point i of each measuring period j, and a cumulative normalized total wear $W_{skum}/C$ is determined therefrom by summation of the wear values $W_{sji}/C$. From this and the corresponding measured cumulative total wear $W_{okum}$, the relationship $$C = W_{okum}/(W_{skum}/C) \qquad \text{Eq. 2}$$

is applied to determine a value for the general constant C.

Applying the value of the general constant C determined thus, the calculated normalized wear values for each measuring period are used $$W_{sj}/C = \Sigma(W_{sji}/C) \qquad \text{Eq. 3}$$

to determine the calculated wear values for each measuring period $W_{sj}$, where the calculated wear values are compared with the measured wear values for each measuring period $W_{oj}$ and an average deviation $$E_m = (\Sigma E_j)/N, \text{ for } j=1 \ldots N \qquad \text{Eq. 4}$$

where $$E_j = |W_{sj} - W_{oj}|$$

for the corresponding measuring period being determined therefrom.

In addition, cumulative deviations over all measuring periods $E_k = |W_{skum} - W_{okum}|$ and a forecast value of the deviation $E_p = |W_{max} - W_{sp}|$ where $$W_{s_p} = W_{s_{kum}} + \tilde{W}_{s_m} \cdot \frac{W_{max} - W_{o_{kum}}}{\tilde{W}_{o_m}} \qquad \text{Eq. 5}$$

$$\tilde{W}_{o_m} = \frac{W_{o_{kum}}}{\sum_{j=1}^{N} t_{B_j}} \qquad \text{Eq. 6}$$

$$\tilde{W}_{s_m} = \frac{W_{s_{kum}}}{\sum_{j=1}^{N} t_{B_j}} \qquad \text{Eq. 7}$$

are also determined.

Figure 2:
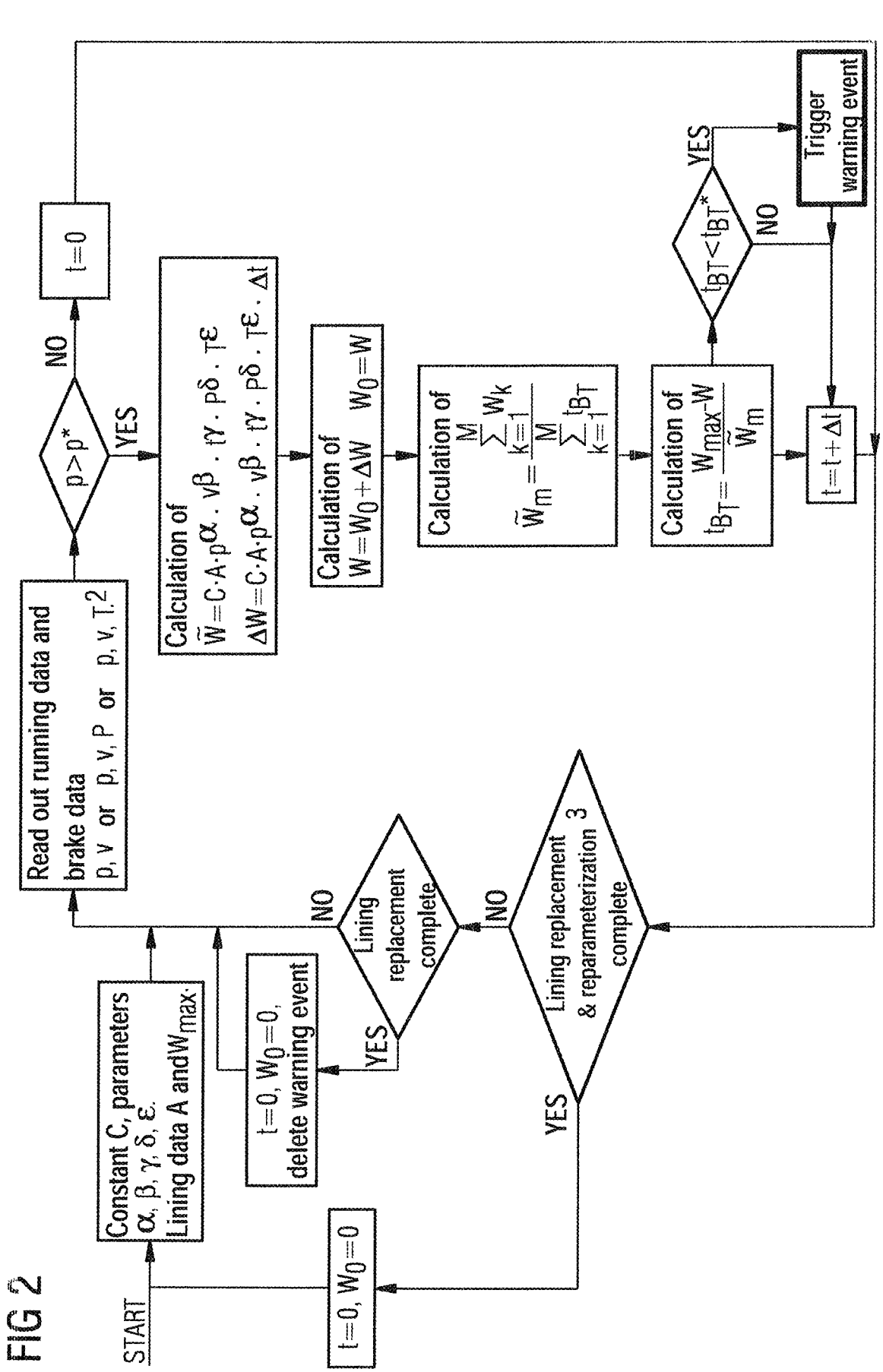
FIG. 2 shows an exemplary flow diagram for continuously forecasting the remaining service life of a brake lining during the operation of a vehicle in accordance with the invention.

The deviation values $E_m$, $E_k$, $E_P$ are compared with predefined maximum values $E_m^*$, $E_k^*$, $E_P^*$ and only if all three values are less than the respectively associated maximum value, i.e., the condition $$E_m < E_m^* \wedge E_k < E_k^* \wedge E_p < E_p^* \qquad \text{Eq. 8}$$

is satisfied, is the method concluded and the current selection of material parameters $\alpha$, $\beta$, $\gamma$, $\delta$, $\varepsilon$ used in conjunction with the inventive method illustrated in FIG. 2 for the purpose of determining, in the operating state, the abrasion of brake linings of rail vehicles that are comparable with the reference vehicle that was used for the parameterization.

If at least one of the cited conditions is not satisfied, however, the method is repeated using a new, changed parameter set. For the purpose of the iterative arithmetic process, use is made of a numerical method such as is routinely applied to solve nonlinear equation systems, e.g., a Newton method or bisection method.

As illustrated in FIG. 2, the contact pressure p (from the cylinder pressure), the sliding speed v (from the running speed) and the braking time $t_B$, and optionally also the temperature T or the brake power P, are determined at periodic time intervals of typically 1-2 seconds in the operating state.

In this case, if the contact pressure p exceeds a predefined value p* and a braking process is therefore indicated, said braking process resulting in a wear of the brake linings, then the now known values of the material parameters $\alpha$, $\beta$, $\gamma$, $\delta$, $\varepsilon$ and the constant C are used in the relationship of Eq. 1

$$\tilde{W} = C \cdot A \cdot p^\alpha \cdot v^\beta \cdot t_B^\gamma \cdot P^\delta \cdot T^\varepsilon$$

to determine a wear rate $\tilde{W}$, which is then used in accordance with the relationship $$\Delta W = C \cdot A \cdot p^\alpha \cdot v^\beta \cdot t^\gamma \cdot P^\delta \cdot T^\varepsilon \cdot \Delta t \qquad \text{Eq. 9}$$

to determine a wear increment $\Delta W$, where $\Delta t$ designates the time interval between two data capture processes or arithmetic processes of the forecast calculation, and the wear increment $\Delta W$ designates the wear during this time window.

From the wear increment $\Delta W$ and a previous wear $W_n$, a new value for the wear is calculated by applying $W_{n+1} = W_n + \Delta W$ and an average wear rate $\tilde{W}_m$ is determined in accordance with the relationship:

$$\tilde{W}_m = \frac{\sum_{k=1}^{M} W_k}{\sum_{k=1}^{M} t_{B_k}} \qquad \text{Eq. 10}$$

where $t_{Bk}$ designates the braking time and $W_k$ designates the calculated wear of a braking process k.

Using the values for the average wear rate $\tilde{W}_m$, the valid wear $W_{n+1}$ and a maximum allowable wear $W_{max}$, it is now possible in accordance with the relationship $$t_{B_T} = \frac{W_{max} - W}{\tilde{W}_m}$$

to determine a total braking time $t_{BT}$ until a lining replacement is required, and the maintenance intervals of the vehicle can be adapted correspondingly.

Figure 3:
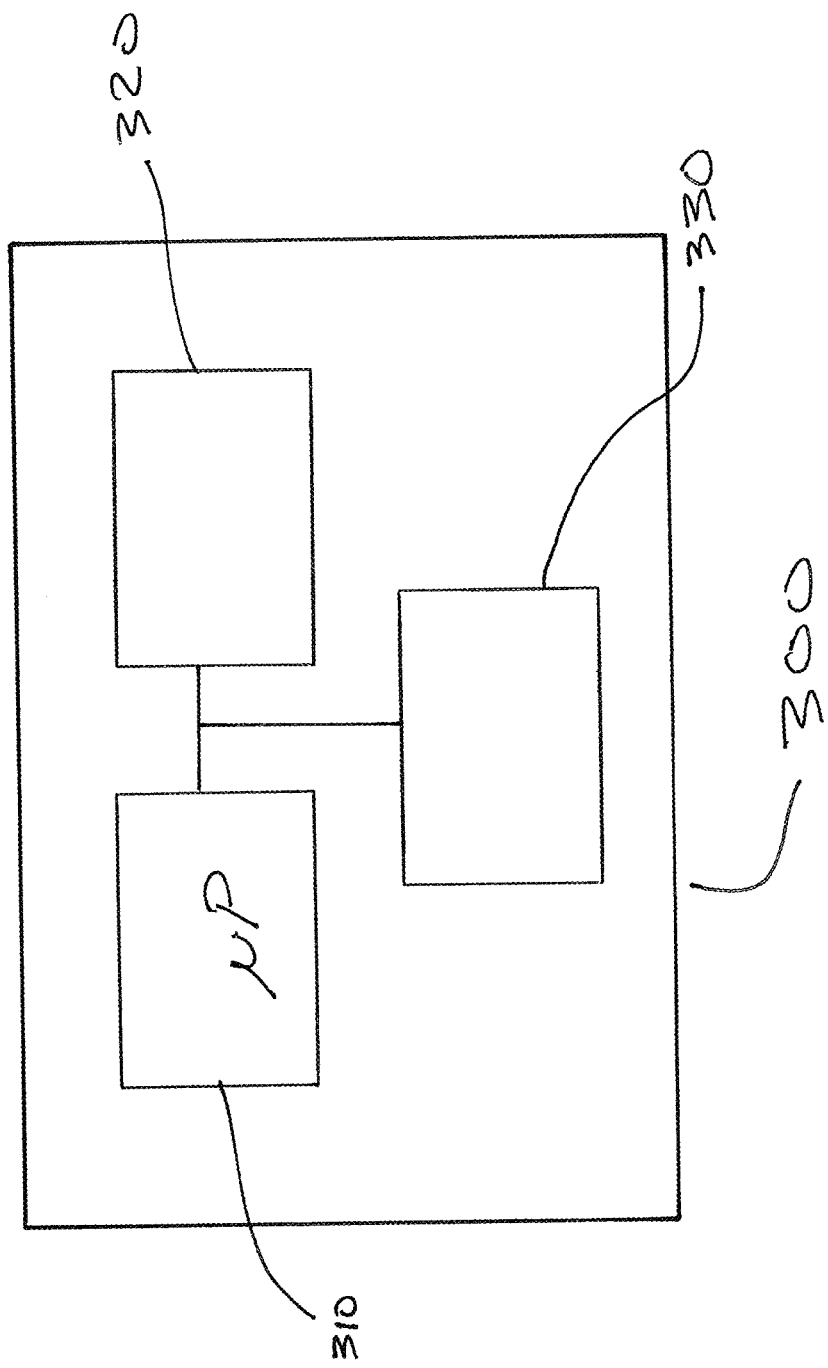
FIG. 3 is a schematic block diagram of the device in accordance with the invention.

FIG. 3 is a schematic block diagram of the device 300 in accordance with the invention. With reference to FIG. 3, the device includes means 310 for determining the brake lining thicknesses, the sliding speed v, the contact pressure p, the braking time $t_B$, the constant C, the material parameters α, β, γ, δ, ε and optionally the temperature T and the brake power (P) during a parameterization process. The device also includes means 320 for determining wear rates $\tilde{W}$ and a wear. In an embodiment, the device additionally includes means 330 for determining the total braking time $t_{BT}$ until the lining replacement is required and for adapting maintenance intervals of the vehicle. In preferred embodiments, the means comprise a processor, a microprocessor and/or some other type of electronic processing device that includes memory.

Thus, while there have been shown, described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A method for determining abrasion of brake linings of rail vehicles, the method comprising:
   determining, by a processor including memory, wear rates ($\tilde{W}$) in accordance with the relationship:

$W = C \cdot A \cdot p^{\alpha} \cdot v^{\beta} \cdot t_B^{\gamma} \cdot P^{\delta} \cdot T^{\varepsilon}$; and determining, by the processor, a wear value from the determined wear rates ($\tilde{W}$) of brake lining thicknesses, a sliding speed (v), a contact pressure (p), a braking time ($t_B$), a temperature (T), a brake power (P), a constant (C) and material parameters (α, β, γ, δ, ε) during a parameterization process via measurements performed at predefined time intervals within a context of test runs utilizing a reference vehicle which is equipped with systems for capturing at least cylinder pressure and running speed such that operational efficiency of the processor is increased,
   where
   C=general constant,
   A=lining surface,
   p=contact pressure,
   v=sliding speed,
   $t_B$=braking time,
   P=brake power,
   T=contact temperature of the friction pairing,
   α=material parameter pressure
   β=material parameter speed
   γ=material parameter braking time,
   δ=material parameter brake power, and
   ε=material parameter temperature;
   wherein a warning is triggered when a total braking time ($t_{BT}$), until a lining replacement is required, is smaller than a threshold level; and
   wherein maintenance intervals of the vehicle are adapted corresponding to the total braking time ($t_{BT}$).

2. The method as claimed in claim 1, wherein at least one of (i) the temperature (T) and (ii) the brake power (P) are not determined and used in a parameterization process via measurements at predefined time intervals, and an influence of values that have not been determined is eliminated in the relationship W by suitable selection of the material parameters for at least one of (i) the temperature (ε) and (ii) the brake power (δ).

3. The method as claimed in claim 2, wherein the parameterization process is performed in relation to the reference vehicle on the test stand.

4. The method as claimed in claim 1, wherein values for an average wear rate ($\tilde{W}_m$), a valid wear ($W_{n+1}$) and a maximum allowable wear ($W_{max}$) are applied in accordance with the following relationship:

$$t_{B_T} = \frac{W_{max} - W}{\tilde{W}_m}$$

to determine the total braking time ($t_{BT}$) until the lining replacement is required, and the maintenance intervals of the vehicle are correspondingly adapted.

5. A device for determining abrasion of brake linings of rail vehicles, comprising:
   a processor including memory, the processor being configured to:
   determine wear rates ($\tilde{W}$) in accordance with the relationship:

$W = C \cdot A \cdot p^{\alpha} \cdot v^{\beta} \cdot t_B^{\gamma} \cdot P^{\delta} \cdot T^{\varepsilon}$; and determine a wear value from the determined wear rates ($\tilde{W}$) of a brake lining thickness, a sliding speed (v), a contact pressure (p), a braking time ($t_B$), temperature (T), a brake power (P) a constant (C) and material parameters (α, β, γ, δ, ε) during a parameterization process via measurements performed at predefined time intervals within a context of test runs utilizing a reference vehicle which is equipped with systems for capturing at least cylinder pressure and running speed such that operational efficiency of the processor is increased,
   where
   C=general constant,
   A=lining surface,
   p=contact pressure,
   v=sliding speed,
   $t_B$=braking time,
   P=brake power,
   T=contact temperature of the friction pairing, α=material parameter pressure
β=material parameter speed
γ=material parameter braking time,
δ=material parameter brake power, and
ε=material parameter temperature;
wherein a warning is triggered when a total braking time ($t_{BT}$), until a lining replacement is required, is smaller than a threshold level; and
wherein maintenance intervals of the vehicle are adapted corresponding to the total braking time ($t_{BT}$).

6. A device for determining abrasion of brake linings of rail vehicles, comprising:
a processor including memory, the processor being configured to:
determine wear rates ($\tilde{W}$) in accordance with the relationship:

$$\tilde{W} = C \cdot A \cdot p^\alpha \cdot v^\beta \cdot t_B^\gamma \cdot P^\delta \cdot T^\varepsilon; \text{ and}$$

determine a wear value from the determined wear rates ($\tilde{W}$) of brake lining thicknesses, a sliding speed (v), a contact pressure (p), a braking time ($t_B$), a constant (C), a temperature (T), brake power (P) and material parameters (α, β, γ, δ, ε) during a parameterization process via measurements performed at predefined time intervals within a context of test runs utilizing a reference vehicle which is equipped with systems for capturing at least cylinder pressure and running speed such that operational efficiency of the processor is increased; and
determine a total braking time ($t_{BT}$) until a lining replacement is required and adapt maintenance intervals of a rail vehicle;
where
C=general constant,
A=lining surface,
p=contact pressure,
v=sliding speed,
$t_B$=braking time,
P=brake power,
T=contact temperature of the friction pairing,
α=material parameter pressure,
β=material parameter speed,
γ=material parameter braking time,
δ=material parameter brake power, and
ε=material parameter temperature; and
wherein values for an average wear rate ($\tilde{W}_m$), a valid wear ($W_{n+1}$) and a maximum allowable wear ($W_{max}$) are applied in the following relationship to:

$$t_{BT} = \frac{W_{max} - W}{\tilde{W}_m}$$

determine the total braking time ($t_{BT}$) until the lining replacement is required, and maintenance intervals of the rail vehicle are correspondingly adapted;
wherein a warning is triggered when the total braking time ($t_{BT}$), until the lining replacement is required, is smaller than a threshold level; and
wherein maintenance intervals of the vehicle are adapted corresponding to the total braking time ($t_{BT}$).

7. A method for determining abrasion of brake linings of rail vehicles, the method comprising:
determining, by a processor including memory, wear rates ($\tilde{W}$) in accordance with the relationship:

$$\tilde{W} = C \cdot A \cdot p^\alpha \cdot v^\beta \cdot t_B^\gamma \cdot P^\delta \cdot T^\varepsilon;$$

determining, by the processor, a wear value from the determined wear rates ($\tilde{W}$) of brake lining thicknesses, a sliding speed (v), a contact pressure (p), a braking time ($t_B$), a temperature (T), a brake power (P), a constant (C) and material parameters (α, β, γ, δ, ε) during a parameterization process via measurements performed at predefined time intervals within a context of test runs utilizing a reference vehicle which is equipped with systems for capturing at least cylinder pressure and running speed such that operational efficiency of the processor is increased; and
optimizing a pressure point between the brake linings and disks of the rail vehicle when the determined wear value indicates the linings of the brakes of the rail vehicle are below a specified minimum thickness,
where
C=general constant,
A=lining surface,
p=contact pressure,
v=sliding speed,
$t_B$=braking time,
P=brake power,
T=contact temperature of the friction pairing,
α=material parameter pressure
β=material parameter speed
γ=material parameter braking time,
δ=material parameter brake power, and
ε=material parameter temperature;
wherein a warning is triggered when a total braking time ($t_{BT}$), until a lining replacement is required, is below the specified minimum thickness; and
wherein maintenance intervals of the vehicle are adapted corresponding to the total braking time ($t_{BT}$).

* * * * *